United States Patent
Liu et al.

(10) Patent No.: US 9,940,500 B2
(45) Date of Patent: Apr. 10, 2018

(54) SUBSTRATE AND DISPLAY PANEL

(71) Applicants: BOE Technology Group Co., Ltd., Beijing (CN); Beijing BOE Optoelectronics Technology Co., Ltd., Beijing (CN)

(72) Inventors: Yingming Liu, Beijing (CN); Xue Dong, Beijing (CN); Haisheng Wang, Beijing (CN); Xiaoliang Ding, Beijing (CN); Shengji Yang, Beijing (CN); Weijie Zhao, Beijing (CN); Liguang Deng, Beijing (CN); Hongjuan Liu, Beijing (CN); Changfeng Li, Beijing (CN); Wei Liu, Beijing (CN); Jing Zhao, Beijing (CN); Jing Pang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 15/115,337

(22) PCT Filed: Sep. 24, 2015

(86) PCT No.: PCT/CN2015/090551
§ 371 (c)(1),
(2) Date: Jul. 29, 2016

(87) PCT Pub. No.: WO2016/206207
PCT Pub. Date: Dec. 29, 2016

(65) Prior Publication Data
US 2017/0147850 A1    May 25, 2017

(30) Foreign Application Priority Data
Jun. 23, 2015 (CN) .......................... 2015 1 0349287

(51) Int. Cl.
*G06K 9/00* (2006.01)
*G06F 3/044* (2006.01)
(Continued)

(52) U.S. Cl.
CPC .......... *G06K 9/0002* (2013.01); *G06F 3/044* (2013.01); *G06F 3/045* (2013.01); *G06K 9/00087* (2013.01); *G09G 3/3648* (2013.01)

(58) Field of Classification Search
USPC ......... 382/124, 115, 312, 260; 1/1; 257/124, 257/350, 414; 307/116
See application file for complete search history.

(56) References Cited

U.S. PATENT DOCUMENTS 7,302,088 B2 * 11/2007 Amano ................ G06K 9/0002
382/124
8,786,033 B2 *  7/2014 Saito .................... A61B 5/1172
257/124

(Continued)

FOREIGN PATENT DOCUMENTS

CN  103530609 A  1/2014
CN  104049828 A  9/2014
(Continued)

OTHER PUBLICATIONS

Mar. 18, 2016—(WO) International Search Report and Written Opinion Appn PCT/CN2015/090551 with English Tran.
May 19, 2017—(CN) First Office Action Appn 201510349287.3 with English Tran.

*Primary Examiner* — Anh H Do
(74) *Attorney, Agent, or Firm* — Banner & Witcoff, Ltd.

(57) ABSTRACT

A substrate includes a pixel array region and a display panel are provided. The pixel array region includes: a base substrate; a light shielding region disposed on the base substrate; and at least one fingerprint sensor pattern disposed in the light shielding region. The fingerprint sensor pattern (Continued)

includes: a driving electrode pattern and a sensing electrode pattern, wherein the driving electrode pattern is configured for providing a driving signal of fingerprint identification, the sensing electrode pattern is configured for receiving a sensing signal of fingerprint identification, and the driving electrode pattern and the sensing electrode pattern are electrically insulated from each other.

14 Claims, 5 Drawing Sheets

(51) Int. Cl.
  *G06F 3/045* (2006.01)
  *G09G 3/36* (2006.01)

(56) References Cited

U.S. PATENT DOCUMENTS

| | | | |
|---|---|---|---|
| 8,866,347 B2* | 10/2014 | Benkley, III | G01N 27/04 |
| | | | 307/116 |
| 9,155,160 B2* | 10/2015 | Endo | H05B 37/00 |
| 2015/0071648 A1 | 3/2015 | Hong et al. | |

FOREIGN PATENT DOCUMENTS

| | | |
|---|---|---|
| CN | 104536638 A | 4/2015 |
| CN | 104699320 A | 6/2015 |
| CN | 104881196 A | 9/2015 |

* cited by examiner

I-I

SUBSTRATE AND DISPLAY PANEL

The application is a U.S. National Phase Entry of International Application No. PCT/CN2015/090551 filed on Sep. 24, 2015, designating the United States of America and claiming priority to Chinese Patent Application No. 201510349287.3, filed on Jun. 23, 2015. The present application claims priority to and the benefit of the above-identified applications and the above-identified applications are incorporated by reference herein in their entirety.

FIELD OF THE ART

Embodiments of the disclosure relate to the technical area of display technologies, more particularly, to a substrate and a display panel comprising the substrate.

BACKGROUND

For the sake of safety, the fingerprint identification technology is generally used to realize user authentication in conventional personal portable electronic device. A display comprises a display region and a non-display region, and a conventional fingerprint identification region is disposed in the non-display region. Correspondingly, a fingerprint sensor pattern is disposed below the fingerprint identification region. As an example, in a known electronic device (such as the smart phone iphone 5S launched by Apple Inc.), an opening is formed on a cover plate which is configured for protecting the display panel. The opening is located within the non-display region of the cover plate and corresponds to the fingerprint identification region, and a sapphire glass covers the opening.

However, the design of an opening and the employment of sapphire glass result in a complex fabrication process, which increases the fabrication cost and decreases a size of the display region, thereby reducing the user experience.

SUMMARY

A first aspect of the disclosure provides a substrate comprising a pixel array region, wherein the pixel array region comprises: a base substrate; a light shielding region disposed on the base substrate; and at least one fingerprint sensor pattern disposed in the light shielding region. The fingerprint sensor pattern comprises: a driving electrode pattern and a sensing electrode pattern, wherein the driving electrode pattern is configured for providing a driving signal of fingerprint identification, the sensing electrode pattern is configured for receiving a sensing signal of fingerprint identification, and the driving electrode pattern and the sensing electrode pattern are electrically insulated from each other.

A second aspect of the disclosure provides a display comprising the substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The term "pixel array region" used in the context is a region comprising a plurality of sub-pixel regions arranged as an array on a substrate, and the sub-pixel regions comprise a light transmitting region to achieve the display purpose. As an example, if the substrate is a color filter substrate, the sub-pixel regions are color filter units (including red, green and blue color filter units, for example). In a liquid crystal display consisting of a color filter substrate and a counter substrate, a position of the pixel array region corresponds to a position of a display region of the display.

Figure 1:
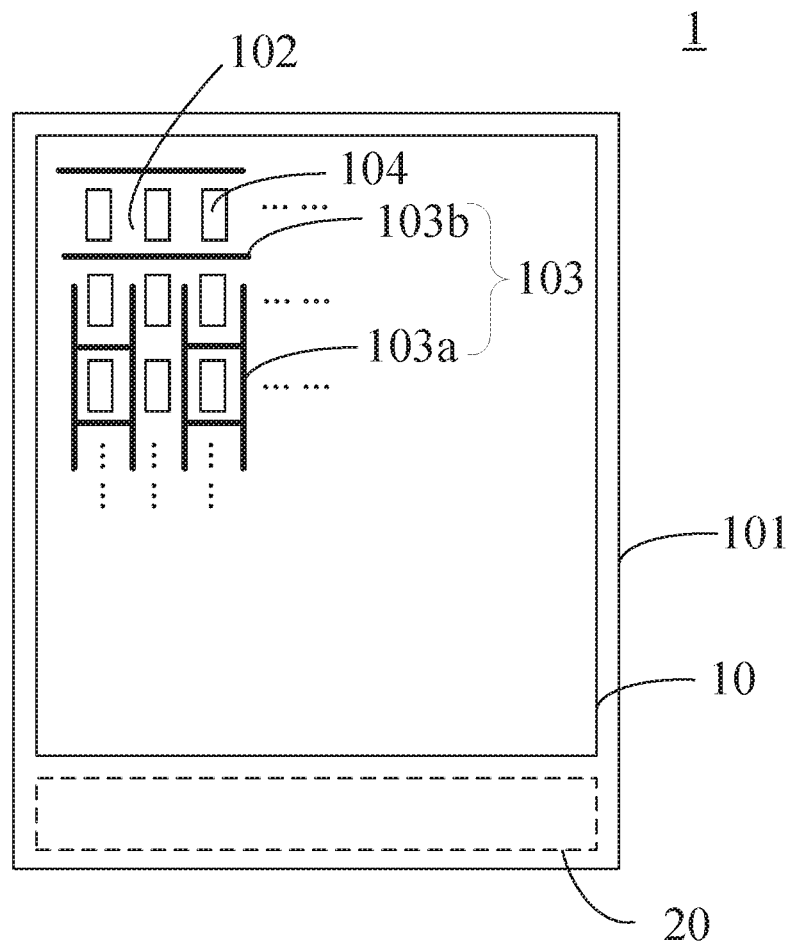
FIG. 1 schematically illustrates a substrate in accordance with an embodiment of the disclosure.

As illustrated in FIG. 1, an embodiment of the disclosure provides a base substrate 1 comprising a pixel array region 10, wherein the pixel array region 10 comprises: a base substrate 101; a light shielding region 102 disposed on the base substrate 101; and at least one fingerprint sensor pattern 103 disposed in the light shielding region 102. The fingerprint sensor pattern 103 comprises: a driving electrode pattern 103a and a sensing electrode pattern 103b, wherein the driving electrode pattern 103a is configured for providing driving signals of fingerprint identification, the sensing electrode pattern 103b is configured for receiving sensing signals of fingerprint identification, and the driving electrode pattern 103a and the sensing electrode pattern 103b are insulated from each other.

In at least one embodiment of the disclosure, the pixel array region 10 comprises the light shielding region 102 and a plurality of light transmitting regions 104. As illustrated in FIG. 1, the plurality of light transmitting regions 104 is arranged as a matrix, and the boundary of each of the light transmitting region 104 is surrounded through the light shielding region 102, that is, any two adjacent light transmitting regions 104 are separated by the light shielding region 102. A light shielding layer is formed in the light shielding region 102 and made of light shielding material, such as black resin material. A light transmitting layer is formed in the light transmitting regions 104. As an example, the substrate is a color filter substrate. The light shielding region 102 acts as a black matrix in order to increase the color contrast of the display and decrease the light leakage. The light transmitting regions 104 act as color filter units. Accordingly, the light transmitting layer may be made of red, green or blue color filter materials, and the red, green and blue color filter units are arranged as a matrix on the base substrate 101. The base substrate 101 is a transparent substrate which is made of such as glass, quartz and plastic, etc. The substrate 1 may further comprise a lead region 20 connected to the fingerprint sensor pattern 103. During the fabrication of the display, the lead region 20 is disposed in a non-display region of the display and is shielded by such as a peripheral black matrix.

Figure 2A:
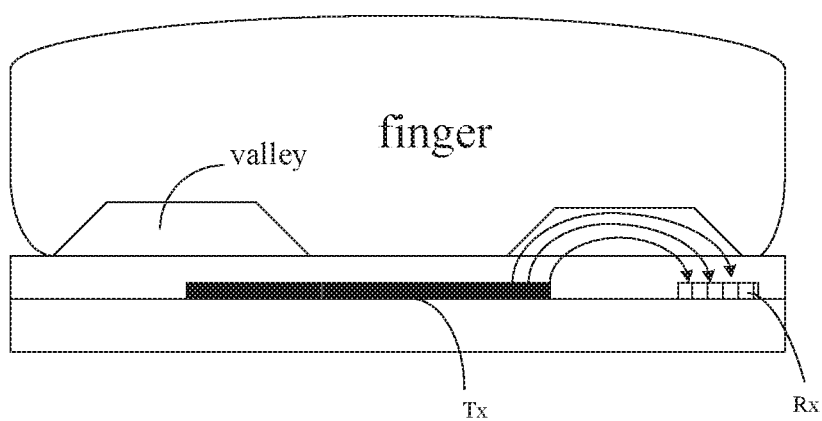
FIG. 2a and FIG. 2b schematically illustrate the principle of mutual capacitance of sliding fingerprint identification.
Figure 2B:
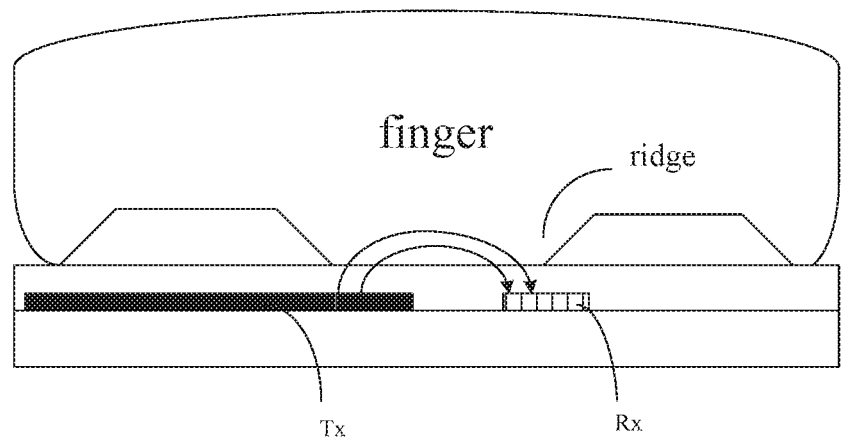

As illustrated in FIG. 1, the fingerprint sensor pattern 103 comprises the driving electrode pattern 103a and the sensing electrode pattern 103b which are both disposed in the light shielding region 102 of the pixel array region 10. When a finger slides on the display and passes by the fingerprint sensor pattern 103, according to the principle of mutual capacitance, an electric field variation is generated between the driving electrode pattern 103a and the sensing electrode pattern 103b, and it is possible to detect a difference between the valley and the ridge of the fingerprint according to the electric field variation. FIG. 2a and FIG. 2b schematically illustrate the principle of mutual capacitance of sliding fingerprint identification. In the moment of FIG. 2a, the position of the fingerprint valley is between a driving electrode line Tx of the driving electrode pattern and a sensing electrode line Rx of the sensing electrode pattern, a capacitance between Tx and Rx is relatively large, thus an electric field value between Tx and Rx is relatively large. In the moment of FIG. 2b, the position of the fingerprint ridge is between the driving electrode line Tx of the driving electrode pattern and the sensing electrode line Rx of the sensing electrode pattern, the capacitance between Tx and Rx is relatively small, and more electric field lines are absorbed by the finger, thus the electric field value between Tx and Rx is relatively small. It is possible to obtain the difference between the valley and the ridge of the fingerprint through comparing the electric field values or capacitances of the two moments, thus obtaining a whole pattern of the fingerprint.

Figure 3:
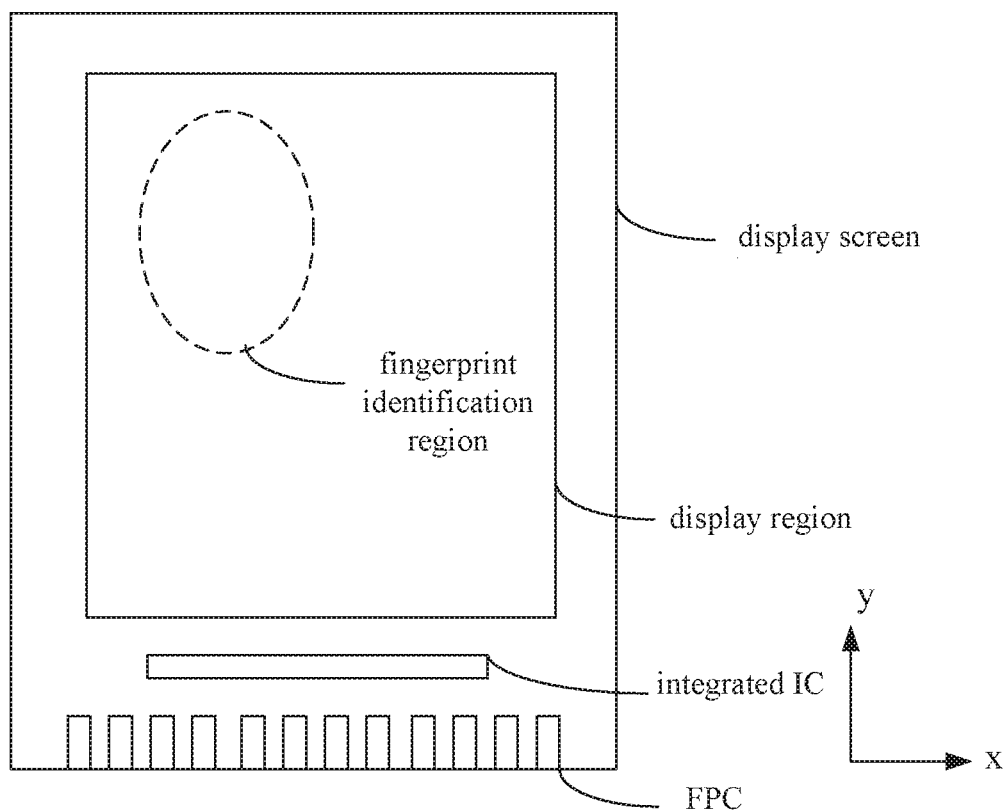
FIG. 3 schematically illustrates a plan view of a display in accordance with an embodiment of the disclosure.

As illustrated in FIG. 3, during the fabricating process of the display employing the substrate 1, the pixel array region 10 of the substrate 1 is in a display region of the display. Disposing the fingerprint sensor pattern 103 in the pixel array region 10 is equivalent to forming a fingerprint identification region in the display region. The fingerprint identification region is still used for display and does not compromise the user's experience. When a finger slides in the fingerprint identification region, it is possible to realize fingerprint identification through the fingerprint sensor pattern 103. It can be conceived that the number of the fingerprint sensor pattern 103 may be more than one such as two, three or more, thus it is possible to identify a plurality of different fingers so as to improve personal information security. Moreover, the fingerprint sensor pattern 103 may be formed in any position in the pixel array region 10. In the case that the number of the fingerprint sensor pattern 103 is plural, the patterns 103 may be disposed in distinct positions, and the positions can be customized according to user's requirement.

The substrate in the embodiment can realize the identification of fingerprints sliding in the display region of the display, which reduces the fabricating cost, moreover, increases the usable area of the display since there is no need to design openings in the non-display region, thereby improving the display effect and user experience.

The disclosure will be further described by taking the substrate 1 which is used as a color filter substrate as an example. It can be conceived that the fingerprint sensor pattern may be integrated on such as a counter substrate configured for a Color-On-Array (COA) substrate and the like or on other substrate such as a COA substrate itself and the like.

Figure 4:
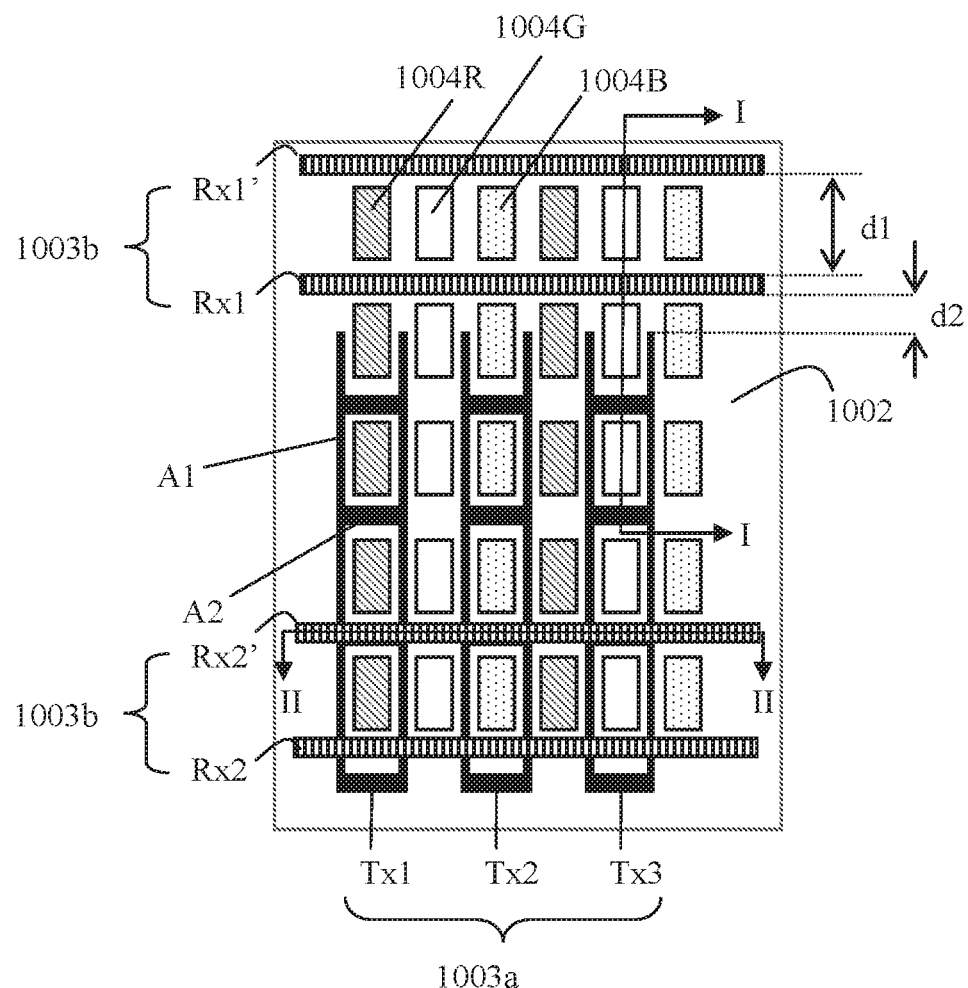
FIG. 4 schematically illustrates a color filter substrate in accordance with an embodiment of the disclosure.
Figure 5:
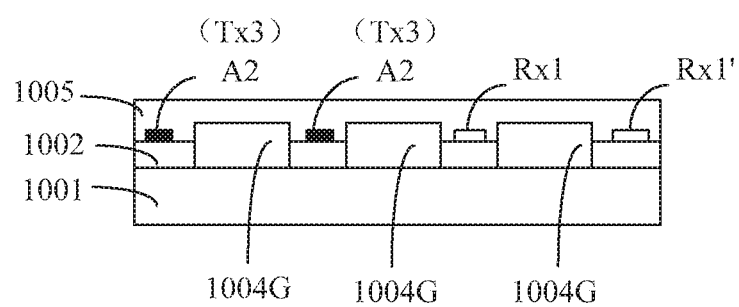
FIG. 5 and FIG. 6 schematically illustrate a cross section along line I-I and line II-II in FIG. 4.
Figure 6:
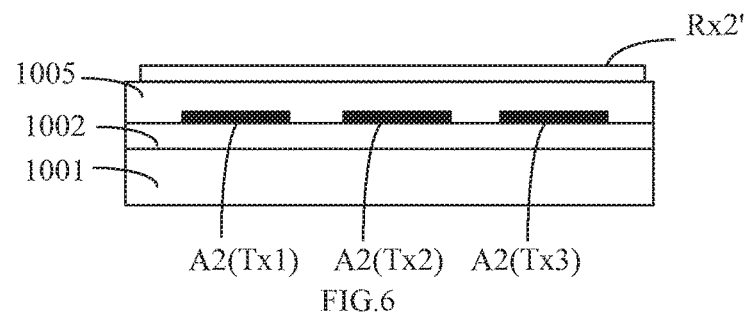

FIG. 4 schematically illustrates a plan view of a color filter substrate having a first fingerprint sensor pattern formed therein in accordance with another embodiment of the disclosure. The first fingerprint sensor pattern is suitable for the fingerprint identification when a finger slides along a vertical direction of the display (i.e., y or −y direction). FIG. 5 and FIG. 6 schematically illustrate a cross section along the line I-I and the line II-II in FIG. 4.

Similar to FIG. 1, the color filter substrate comprises a pixel array region, the "pixel array region" used herein is a region comprising a plurality color filter units arranged as a matrix. As illustrated in FIG. 4 to FIG. 6, the pixel array region comprises a base substrate 1001, a plurality of color filter units 1004 formed on the base substrate 1001, a black matrix 1002 surrounding the plurality color filter units 1004, a fingerprint sensor pattern 1003 formed on the black matrix 1002, and a passivation layer 1005 overlaying the whole substrate.

The color filter units 1004 comprise red filter units 1004R or green filter units 1004G or blue filter units 1004B or other color filter units such as yellow filter units. In this embodiment, the red filter units 1004R, the green filter units 1004G and the blue filter units 1004B are arranged in an array on the base substrate 1001 and any two color filter units 1004 are separated by the black matrix 1002. The black matrix 1002 is made of such as a black resin material to avoid light leakage. The passivation layer 1005 is made of an insulation material such as an organic insulation material (such as resin) or an inorganic insulation material (such as silicon oxide, silicon nitride or the like).

As illustrated in FIG. 4, the fingerprint sensor pattern 1003 comprises a driving electrode pattern 1003a and a sensing electrode pattern 1003b which are both disposed in the region having the black matrix therein so as to prevent the compromise to the display effect from the electrode pattern. The driving electrode pattern 1003a comprises a plurality of driving electrode lines Tx1, Tx2, Tx3 . . . Txn which are parallel to each other. The sensing electrode pattern 1003b comprises two groups of sensing electrode lines, i.e., a first group of sensing electrode lines Rx1 and Rx1' and a second group of sensing electrode lines Rx2 and Rx2'. Each of the driving electrode lines (Tx1, Tx2, Tx3 . . . Txn) and each of the sensing electrode lines (Rx1, Rx1', Rx2, Rx2') are electrically insulated from each other and orthogonal to each other along extension directions.

Each of the sensing electrode lines (for example, the sensing electrode line Rx1) extends along a horizontal direction in paper plane. Each of the driving electrode lines (for example, the driving electrode line Tx1) comprises two first driving portion A1 and a plurality of second driving portion A2 which connects the two first driving portion A1. The two first driving portions A1 extend along a vertical direction in the paper plane and are parallel to each other and the plurality of the second driving portion A2 extends along the horizontal direction and are parallel to each other.

As illustrated in FIG. 5, the first group of sensing electrode lines Rx1, Rx1' and the second driving portion A2 of the driving electrode line Tx3 are disposed in a same layer and electrically insulated from each other. In the same way, the first group of sensing electrode lines Rx1, Rx1' and each of the driving electrode lines are disposed in a same layer and do not contact with each other.

As illustrated in FIG. 6, the sensing electrode line Rx2' is disposed on a different layer with the driving electrode lines, however, the sensing electrode line and the driving electrode lines are separated by the passivation layer 1005 and are electrically insulated from each other. In the same way, the second group of sensing electrode lines Rx2, Rx2' is orthogonal and intercross to each of the driving electrode lines.

The position relationship between the two groups of sensing electrode lines and the driving electrode lines shown in FIG. 5 and FIG. 6 are for illustrative purpose only. In other embodiments, it is possible to dispose the two group of sensing electrode lines Rx1, Rx1', Rx2, Rx2' on a same layer and dispose the driving electrode lines Tx1, Tx2, Tx3 . . . Txn on another layer different from the above layer, which can also realize that the sensing electrode lines and the driving electrode lines are insulated from each other.

Sizes of the driving electrode pattern 1003a and the sensing electrode pattern 1003b may be determined according to real requirements. As an example, a width of each of the sensing electrode lines Rx1 is 32 μm approximately, a distance d1 between the sensing electrode lines Rx1 and Rx1' is 32 μm approximately, and a distance between the Rx2 and Rx2' is also 32 μm approximately. A distance (or referred to as "facing distance") d2 between the sensing electrode line Rx1 and the driving electrode line Tx1 (or Tx2, Tx3) is ranging from 25 μm to 50 μm. A distance (or referred to as "column width") between the two first driving portion A1 is 25 μm approximately, and a distance (or referred to as "column interval") between the two driving electrode lines Tx1 and Tx2 is 25 μm approximately. A number of the driving electrode lines are selected according to a size of a button of the display. If the design is carried out in a display with a resolution of 508 DPI, a width of 150 driving electrode lines is 7.5 mm approximately, that is, a width of the fingerprint sensor pattern 1003 is 7.5 mm approximately. A length of the fingerprint sensor pattern 1003 is determined by the distance between the two groups of sensing electrode lines and thus may be selected according to real requirement.

The working principle of fingerprint identification will be described by taking the display fabricated by the color filter substrate in FIG. 4 as an example. When a finger slides along the vertical direction (as an example, slides downwards with starting from the first group of sensing electrode lines Rx1 and Rx1' in FIG. 4), Tx1 sends a driving signal firstly, at the same time, the two groups of sensing electrode lines receive sensing signals simultaneously and the rest of Tx2, Tx3, . . . Txn are all grounded; next, Tx2 sends a driving signal, at the same time, the two groups of sensing electrode lines receive sensing signals simultaneously and the rest of Tx1, Tx3, . . . Txn are all grounded; and so on, until the driving of Txn is finished. As the driving frequency is relatively high (approximately dozens of MHz), all information passing Rx will be recorded to form complete fingerprint information after the finger slides from top to bottom. For example, the first group of sensing electrode lines Rx1, Rx1' is a differential pair signal receiving line, which can eliminate the outside noise and capture signals better. The second group of sensing electrode lines Rx2, Rx2' is used to capture a time difference of detection signals from that of the first group of sensing electrode lines Rx1, Rx1', thus it is possible to estimate a sliding speed of the finger, and further piece together the fingerprint images obtained under different sliding speed into a uniform shape (unified fingerprint pattern). In order to further increasing the accuracy of fingerprint identification, it is possible to configure more groups of sensing electrode lines to shorten a scan driving time in other embodiments.

Figure 7:
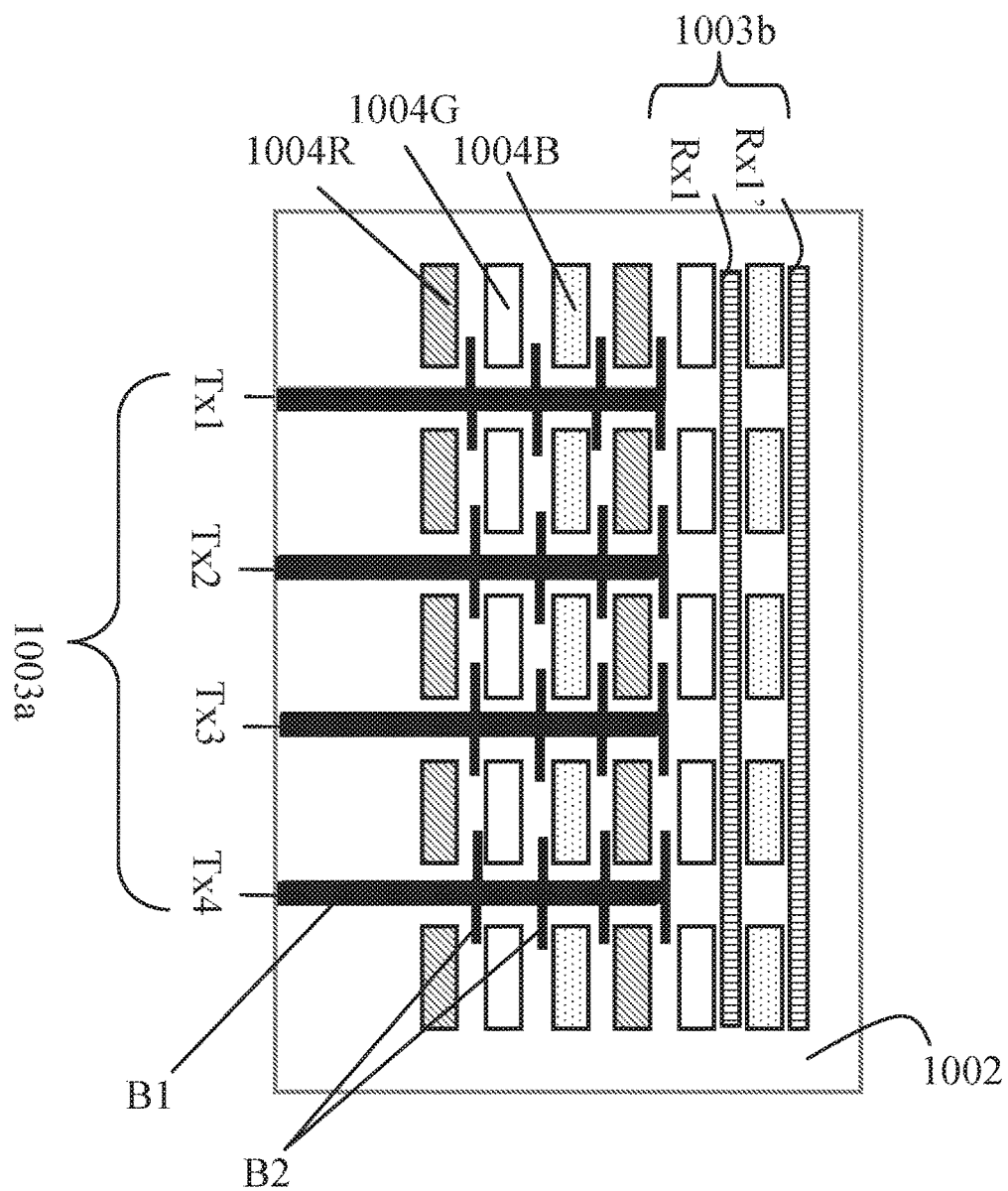
FIG. 7 schematically illustrates another color filter substrate in accordance with an embodiment of the disclosure.

FIG. 7 schematically illustrates a plan view of a color filter substrate having a second fingerprint sensor pattern therein in accordance with another embodiment of the disclosure. The second fingerprint sensor pattern is suitable for a fingerprint identification when a finger slides along a horizontal direction of the display (i.e., x or −x direction).

In the second fingerprint sensor pattern which is different with the first fingerprint sensor pattern in FIG. 4, each of the sensing electrode lines (for example, the sensing electrode line Rx1) extends along a vertical direction, each of the driving electrode lines (for example, the driving electrode line Tx1) comprises a main driving portion B1 which extends along a horizontal direction and a plurality of auxiliary driving portions B2 which extends along the vertical direction, and each of the auxiliary driving portions B2 contacts with and is orthogonal to the main driving portion B1. Similarly, a distance (or referred to as "facing distance") between the sensing electrode line Rx1' and the driving electrode line Tx1 (or Tx2, Tx3, Tx4) is ranging from 25 μm to 50 μm approximately.

When a finger slides along the horizontal direction (as an example, slides from left to right with starting from the second group of sensing electrode lines Rx2, Rx2' in FIG. 7), firstly, Tx1 sends a driving signal, at the same time, the two groups of sensing electrode lines receives the sensing signals simultaneously and the rest of Tx2, Tx3, Tx4, . . . Txn are all grounded; next, Tx2 sends a driving signal, at the same time, the two groups of sensing electrode lines receive the sensing signals simultaneously and the rest of Tx1, Tx3, Tx4, . . . Txn are all grounded; and so on, until a driving of Txn is finished. As the driving frequency is relatively high, all information passing Rx will be recorded to form complete fingerprint information after the finger slides from left to right.

The color filter substrate in the embodiment can realize the identification of fingerprints sliding in the display region of the display, which reduces the fabricating cost, moreover, increases the usable area of the display since there is no need to design openings in the non-display region, thereby improving the display effect and user experience.

As illustrated in FIG. 3, a display comprising the substrate of any of the above embodiments is provided in still another embodiment of the disclosure. The display comprises a display region and a non-display region, wherein the non-display region is a region of the display outside the display region and comprises IC and flexible printed circuit (FPC). The display region comprises at least one fingerprint identification region corresponding to the at least one fingerprint sensor pattern in the above embodiments. An area of the fingerprint identification region is smaller than that of the display region, a shape of the fingerprint identification region may be a circle similar to a finger or a rectangle which allows a finger to slide therein, and a number, the shape and the area of the fingerprint identification region may be designed according to the real requirements.

Figure 8:
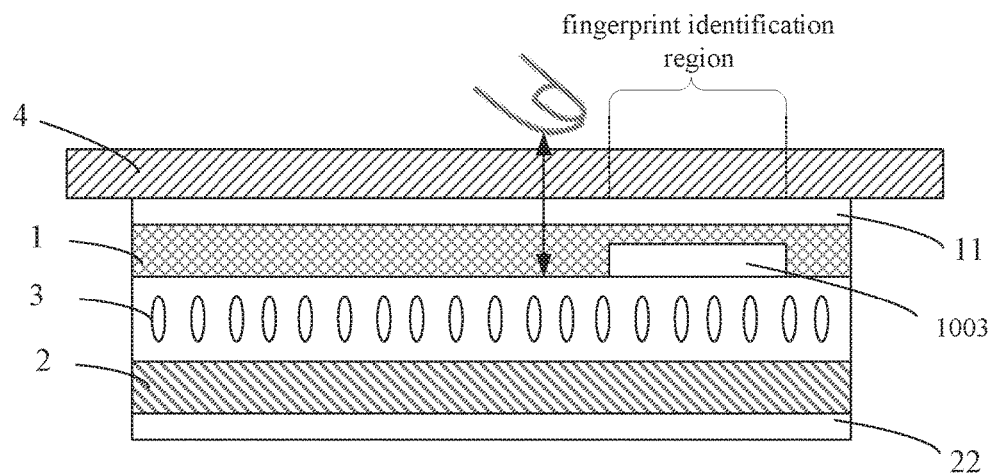
FIG. 8 schematically illustrates a display in accordance with an embodiment of the disclosure.

As illustrated in FIG. 8, in at least one embodiment of the disclosure, the display is a liquid crystal display, the substrate is a color filter substrate 1, and the liquid crystal display further comprises an array substrate 2 arranged opposite to the color filter substrate 1. A liquid crystal layer 3 is disposed between the color filter substrate 1 and the array substrate 2 in the display region. An upper polarizer 11 and a lower polarizer 22 are disposed on the outermost layer of the color filter substrate 1 and the array substrate 2 respectively, wherein a cover plate 4 is adhered on the upper polarizer 11 and the cover plate 4 is a flat plate. The fingerprint sensor pattern 1003 in any of the above embodiments is integrated on the color filter substrate 1. The fingerprint identification region is formed above the fingerprint sensor pattern 1003 correspondingly.

Figure 9:
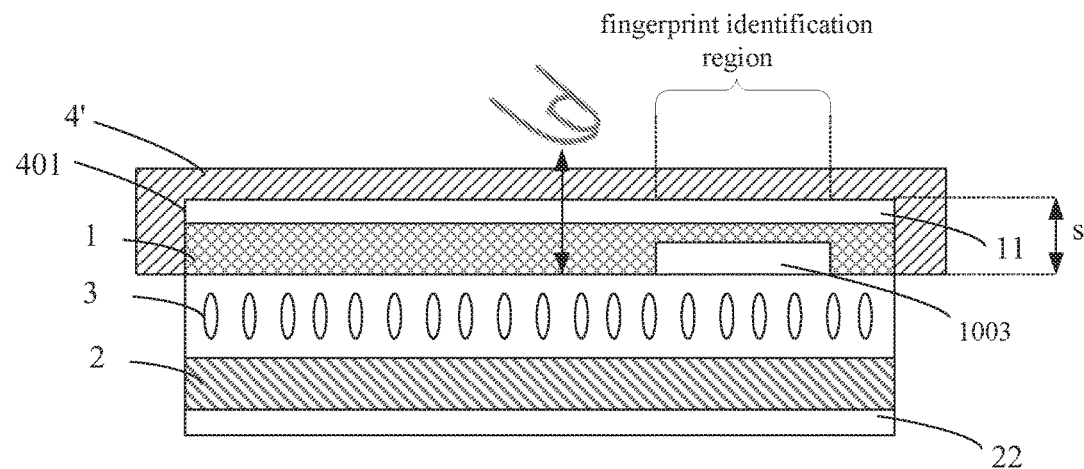
FIG. 9 schematically illustrates another display in accordance with an embodiment of the disclosure.

In order to shorten a distance (double arrow as illustrated in FIG. 8) between the finger and the fingerprint sensor pattern so as to further improve the sensitivity of fingerprint identification, in an embodiment, a groove 401 is formed on a side of a cover plate 4' facing the color filter substrate 1 and configured for accommodating the upper polarizer 11 and the whole color filter substrate 1 as illustrated in FIG. 9. In this case, as the color filter substrate 1 and the upper polarizer 11 are cladded by the groove 401, it is possible to decrease the thickness of a portion of the cover plate 4' located on the upper polarizer 11, thereby shortening the distance between the finger and the fingerprint sensor pattern 1003. Internal walls of the groove 4 surround the periphery of the upper polarizer 11 and the color filter substrate 1. For example, a depth s of the groove 4 is substantially equal to a sum of thicknesses of the upper polarizer 11 and the color filter substrate 1.

In at least one embodiment of the disclosure, the display is touch display and the touch display comprises a touching structure. The touching structure may be a resistance type, a capacitor type, etc. As an example, the touching structure is fabricated based on self-capacitance principle or mutual capacitance principle when being a resistance type. The touching structure may comprises a touch sensing electrode and a touch driving electrode when fabricated based on mutual capacitance principle, wherein the touch sensing electrode and the touch driving electrode may be formed on one of the color filter substrate and the array substrate. Moreover, the touch sensing electrode and the touch driving electrode may be arranged at least the whole display region; alternatively, the touch sensing electrode and the touch driving electrode may further extend beyond the display region partly. The touch display may be a variety of types. As an example, the touching structure may be disposed on a touch screen and the touch display is disposed on the front side (such as OGS type) of the display panel (such as liquid crystal panel or OLED panel); or the touching structure may be formed as a part of the display panel, as an example, the touch sensing electrode and the touch driving electrode are all formed on an outer surface (i.e., On-cell type) of an upper substrate (such as a color filter substrate) of the display panel, or formed in the display panel (i.e., In-cell type), or all formed on the color filter substrate or the array substrate, or formed on the color filter substrate and the array substrate respectively. The touch sensing electrode and the touch driving electrode are electrically insulated from the fingerprint sensor pattern 1003 respectively to prevent a mutual interference. In the embodiment, the display may be configured for inputting instructions, such as touch instructions of touching, sliding, gesture and the like, and configured for fingerprint identification, thus various functions are integrated into the display, thereby improving the user experience and saving the fabricating cost.

The display of the above embodiment realizes identification of fingerprints sliding in the display region, which reduces the fabricating cost, moreover, increases the usable area of the display because there is no need to design openings in the non-display region, thereby improving the display effect and user experience.

What is described above is related to the illustrative embodiments of the disclosure only and not limitative to the scope of the disclosure; the scopes of the disclosure are defined by the accompanying claims.

The present application claims the priority of Chinese Patent Application No. 201510349287.3, filed on Jun. 23, 2015, the disclosure of which is incorporated herein by reference in its entirety.

What is claimed is:

1. A substrate, comprising a pixel array region, wherein the pixel array region comprises:
   a base substrate;
   a light shielding region disposed on the base substrate; and
   at least one fingerprint sensor pattern disposed in the light shielding region, and the at least one fingerprint sensor pattern comprises:
   a driving electrode pattern and a sensing electrode pattern, wherein the driving electrode pattern is configured for providing a driving signal of fingerprint identification, the sensing electrode pattern is configured for receiving a sensing signal of fingerprint identification, and the driving electrode pattern and the sensing electrode pattern are electrically insulated from each other;
   wherein the pixel array region further comprises a plurality of light transmitting regions and the plurality of light transmitting regions is surrounded and separated by the light shielding region.

2. The substrate of claim 1, wherein the driving electrode pattern comprises a plurality of driving electrode lines parallel to each other, the sensing electrode pattern comprises two groups of sensing electrode lines, each of the plurality of driving electrode lines and each of the sensing electrode lines are electrically insulated from each other and orthogonal to each other along extension directions.

3. The substrate of claim 2, wherein each of the sensing electrode lines extends along a horizontal direction, each of the plurality of driving electrode lines comprises two first driving portions and a plurality of second driving portions connecting the two first driving portions; the first driving portions extend along a vertical direction and are parallel to each other, and the plurality of second driving portions extend along the horizontal direction and are parallel to each other.

4. The substrate of claim 2, wherein each of the sensing electrode lines extends along a vertical direction, each of the plurality of driving electrode lines comprises a main driving portion which extends along a horizontal direction and a plurality of auxiliary driving portions which extends along the vertical direction, and each of the auxiliary driving portions is connected to and orthogonal to the main driving portion.

5. The substrate of claim 1, wherein the substrate is a color filter substrate, the light shielding region is a black matrix, and color filter units are disposed in a light transmitting region of the plurality of light transmitting regions.

6. A display panel, comprising the substrate of claim 1.

7. The display panel of claim 6, wherein the display panel comprises a display region and a non-display region, and the display region comprises at least one fingerprint identification region corresponding to the at least one fingerprint sensor pattern.

8. The display panel of claim 7, wherein an area of the fingerprint identification region is smaller than that of the display region.

9. The display panel of claim 7, wherein the display panel is a liquid crystal display panel, the substrate is a color filter substrate, and the liquid crystal display panel further comprises an array substrate arranged as opposed to the color filter substrate.

10. The display panel of claim 9, further comprising an upper polarizer and a cover plate disposed on the color filter substrate, wherein a groove is formed on a side of the cover plate facing the color filter substrate and configured for accommodating the upper polarizer and the color filter substrate.

11. The display panel of claim 10, wherein a periphery of the upper polarizer and the color filter substrate are surrounded by an internal wall of the groove.

12. The display panel of claim 10, wherein a depth of the groove is equal to a sum of a thickness of the upper polarizer and a thickness of the color filter substrate.

13. The display panel of claim 9, further comprising a touching structure disposed at least in the display region.

14. The display panel of claim 13, wherein the touching structure comprises a touch sensing electrode and a touch driving electrode, and the touch sensing electrode and the touch driving electrode are disposed on at least one of the color filter substrate and the array substrate.

* * * * *